United States Patent
Chen (10) Patent No.: US 11,001,336 B2
(45) Date of Patent: May 11, 2021

(54) BICYCLE BRAKING SYSTEM

(71) Applicant: TEKTRO TECHNOLOGY CORPORATION, Changhua County (TW)

(72) Inventor: Chao-Kung Chen, Changhua County (TW)

(73) Assignee: TEKTRO TECHNOLOGY CORPORATION, Changhua County (TW)

(*) Notice: Subject to any disclaimer, the term of this patent is extended or adjusted under 35 U.S.C. 154(b) by 0 days.

(21) Appl. No.: 16/934,335

(22) Filed: Jul. 21, 2020

(65) Prior Publication Data
US 2021/0086866 A1    Mar. 25, 2021

(30) Foreign Application Priority Data
Sep. 25, 2019   (TW) .................................. 108212670

(51) Int. Cl.
*B62L 3/02*    (2006.01)

(52) U.S. Cl.
CPC ...................................... *B62L 3/02* (2013.01)

(58) Field of Classification Search
CPC .... B62L 3/026; B62L 3/02; B62L 3/06; B60T 11/046; B60T 7/102; B60T 7/104;
(Continued)

(56) References Cited

U.S. PATENT DOCUMENTS 3,546,960 A * 12/1970 Masuda .................... B62L 3/02
                                                          74/489
4,066,154 A *  1/1978 Ross ......................... B62L 3/02
                                                        188/196 BA
(Continued)

FOREIGN PATENT DOCUMENTS

CN         208915343 U  *  5/2019
DE          19510782 A1 *  9/1996  ............... B62H 5/18
(Continued)

OTHER PUBLICATIONS

EPO Machine Translation of WO 2017/125106 A1, Schnuttgen, Jul. 27, 2017 (Year: 2017).*
(Continued)

*Primary Examiner* — Vinh Luong
(74) *Attorney, Agent, or Firm* — Locke Lord LLP; Tim Tingkang Xia, Esq.

(57) ABSTRACT

A bicycle braking system includes a lever assembly, a parking brake mechanism, and a positioning assembly. The lever assembly includes a housing and a brake lever pivotably disposed on the housing. The housing has a first positioning structure, and the brake lever has an engagement portion. The parking brake mechanism includes a control handle pivotably disposed on the housing so as to be engaged or disengaged with the engagement portion. The positioning assembly includes a positioning handle pivotably disposed on the control handle and having a locked position and an unlocked position. when the positioning handle is in the locked position, the positioning handle is positioned at the first positioning structure so as to stop the control handle from be pivoted with respect to the housing. When the positioning handle is in the unlocked position, the positioning handle is removed from the first positioning structure.

14 Claims, 10 Drawing Sheets

(58) Field of Classification Search
CPC ....... B62K 23/06; B62K 9/00; F16D 2125/60; G05G 1/04; G05G 11/00; F16C 1/10; Y10T 74/20287; B62B 5/048; B62B 5/0457; B62B 5/06; B62B 9/085; B62B 9/087; B62B 9/20
See application file for complete search history.

(56) References Cited

U.S. PATENT DOCUMENTS

| | | | | |
|---|---|---|---|---|
| 2002/0033065 A1* | 3/2002 | Ose | ................... | B62M 25/04 74/502.2 |
| 2011/0169245 A1* | 7/2011 | Fulghum | ................ | B60T 7/104 280/264 |
| 2011/0192251 A1* | 8/2011 | Lockett, Jr. | ............ | B62K 23/06 74/511 R |
| 2015/0101445 A1* | 4/2015 | Lim | ................... | G05G 1/04 74/502.2 |
| 2016/0355235 A1* | 12/2016 | Minto | ................... | B62K 23/06 |

FOREIGN PATENT DOCUMENTS

| | | | | |
|---|---|---|---|---|
| DE | 19522259 A1 | * | 1/1997 | |
| GB | 20208 | * | 11/1901 | ................ B62L 3/02 |
| WO | WO 90/09306 | * | 8/1990 | |
| WO | WO 2017/125106 A1 | * | 7/2017 | ............. B60T 11/16 |

OTHER PUBLICATIONS

Derwent Abstract of DE 19522259 A1, Meyer Erhard, Jan. 2, 1997 (Year: 1997).*
Define engage, merriam-webster.com/dictionary/engage, Feb. 12, 2021 (Year: 2021).*
Define connected, Google Search, Mar. 12, 2021 (Year: 2021).*

* cited by examiner

BICYCLE BRAKING SYSTEM

CROSS-REFERENCE TO RELATED APPLICATIONS

This non-provisional application claims priority under 35 U.S.C. § 119(a) on Patent Application No(s). 108212670 filed in Taiwan, R.O.C. on Sep. 25, 2019, the entire contents of which are hereby incorporated by reference.

TECHNICAL FIELD

The disclosure relates to a bicycle braking system, more particularly to a bicycle braking system having a parking brake mechanism and positioning assembly for positioning the parking brake mechanism.

BACKGROUND

Outdoor cycling gives participants the chance to enjoy the scenes around while obtaining benefits of fitness, thus it has become more and more popular in the present society. Mountain cycling is also a popular sport of riding bicycle, often over rough terrain and steep downhill and uphill.

Because of the long distance and numerous hills, a few proper short period of rest may be necessary. For the bicycle to be able to rest on hill, some bicycles are equipped with a parking brake mechanism to allow user to hold the brake lever in squeezed position so as to keep the bicycle in the braking state. The mechanism allows user to apply the brake without keeping squeezing the brake lever.

The typical parking brake mechanisms are activated by operating a handle, but the user often accidentally or unconsciously move the handle to release the brake lever from the parking brake mechanism, resulting in unexpected situations. Therefore, bicycle developers are desired to work on improving the parking brake mechanism.

SUMMARY OF THE INVENTION

The disclosure provides a bicycle braking system capable of preventing the parking brake mechanism from being accidentally deactivated.

One embodiment of the disclosure provides a bicycle braking system. The bicycle braking system includes a lever assembly, a parking brake mechanism, and a positioning assembly. The lever assembly includes a housing and a brake lever. The brake lever is pivotably disposed on the housing. The housing has a first positioning structure, and the brake lever has an engagement portion. The parking brake mechanism includes a control handle. The control handle is pivotably disposed on the housing so as to be engaged or disengaged with the engagement portion. The positioning assembly includes a positioning handle pivotably disposed on the control handle and having a locked position and an unlocked position. When the positioning handle is in the locked position, the positioning handle is positioned at the first positioning structure so as to stop the control handle from be pivoted with respect to the housing. When the positioning handle is in the unlocked position, the positioning handle is removed from the first positioning structure so as to allow the control handle to become pivotable with respect to the housing.

According to the bicycle braking system as discussed above, when the positioning handle is in the locked position, the positioning component is positioned at the first positioning structure so as to stop the control handle from being pivoted with respect to the housing. As such, the positioning handle in the locked position can fix the control handle in position after the brake lever is pulled and engaged with the engagement component. Therefore, accidentally or unconsciously force applying to the control handle will not cause it to be disengaged from the engagement portion of the engagement component.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
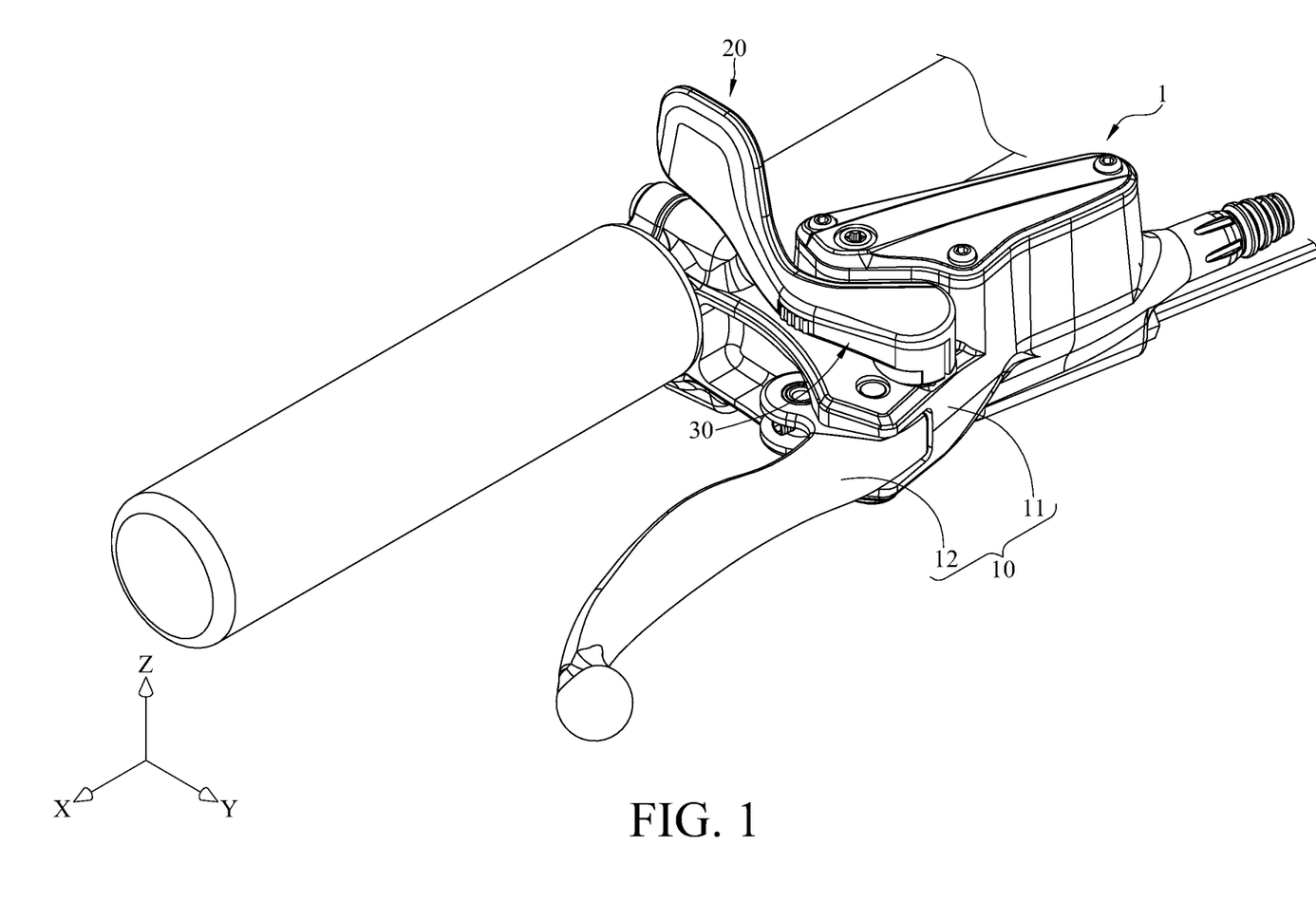
FIG. 1 is a perspective view of a bicycle braking system according to a first embodiment of the disclosure.
Figure 2:
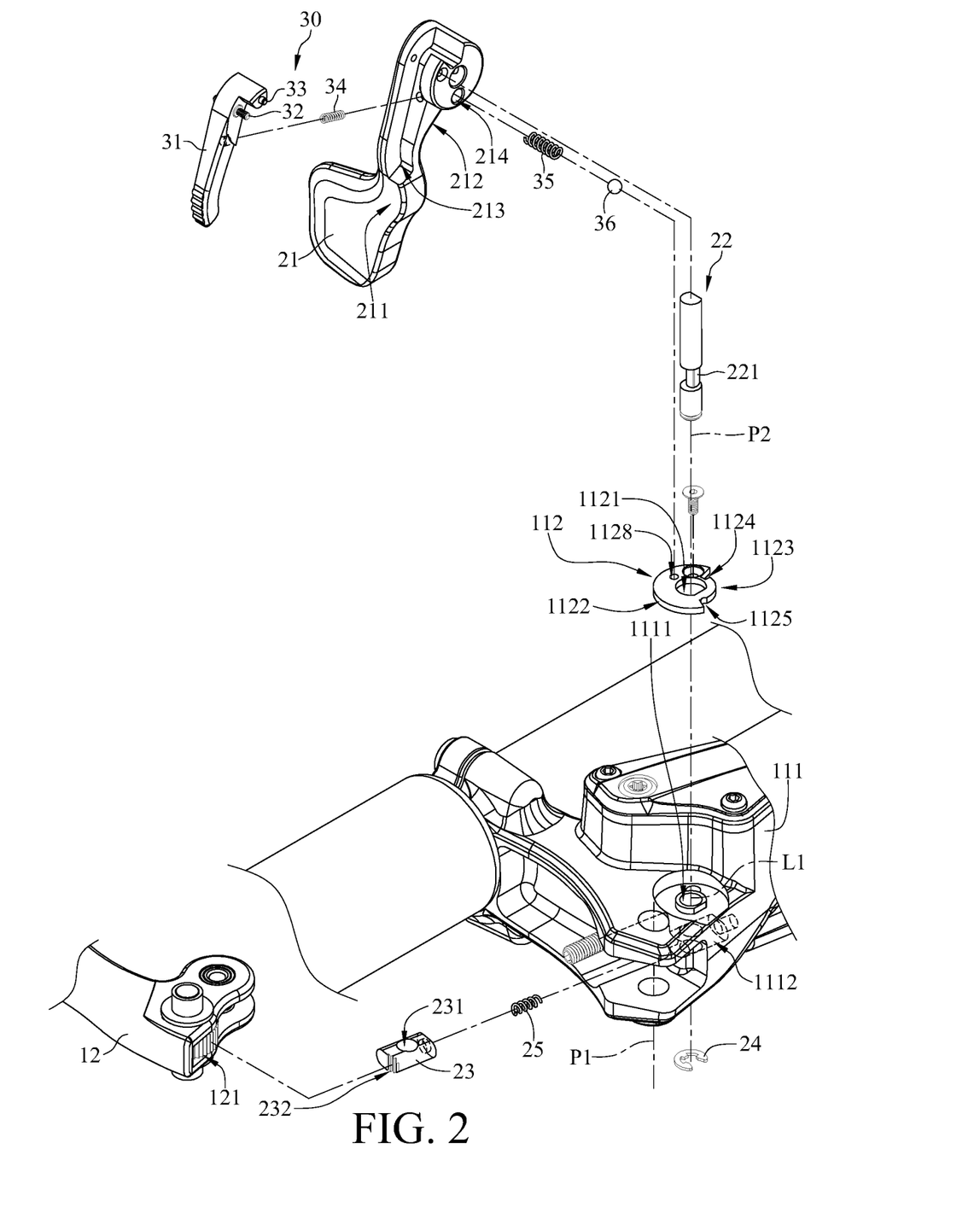
FIG. 2 is a partial enlarged exploded view of the bicycle braking system in FIG. 1.
Figure 3:
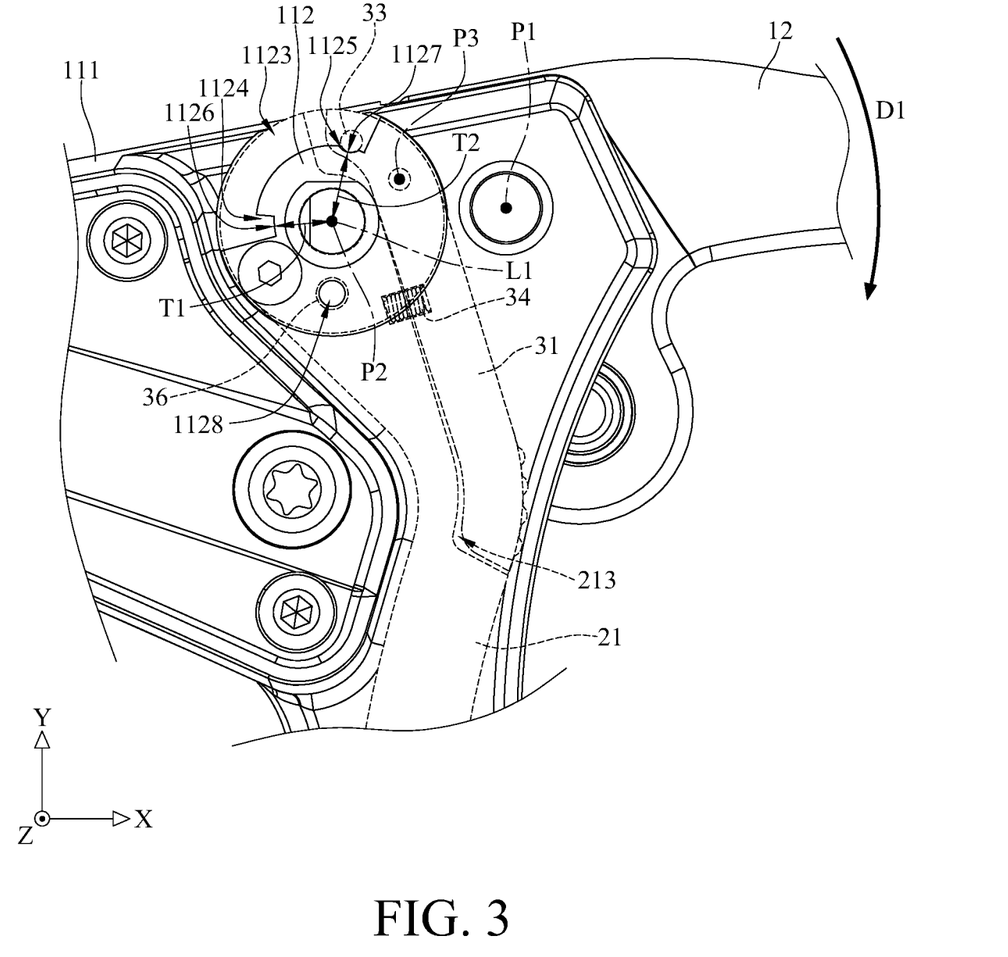
FIG. 3 is a partial enlarged top view of the bicycle braking system in FIG. 1 when a control handle is in a released position.

Referring to FIGS. 1 to 4, there are shown a perspective view of a bicycle braking system 1 according to a first embodiment of the disclosure, a partial enlarged exploded view of the bicycle braking system 1 in FIG. 1, a partial enlarged top view of the bicycle braking system in FIG. 1 when a control handle 21 is in a released position, and a partial enlarged cross-sectional view of the bicycle braking system 1 in FIG. 3.

In this embodiment, the bicycle braking system 1 includes a lever assembly 10, a parking brake mechanism 20, and a positioning assembly 30.

The lever assembly 10 includes a housing 11 and a brake lever 12 pivotably disposed on the housing 11. As shown, pulling the brake lever 12 along a direction D1 can actuate the brakes (by means of pulling a cable or compressing hydraulic fluid) to bring the bicycle to a halt. The housing 11 includes a housing part 111 and a positioning part 112. The housing part 111 has an insertion hole 1111 and a recess 1112 connected to each and respectively extending along different directions. In this embodiment, an extension direction of the insertion hole 1111 is, for example, parallel to an axis P1 of the brake lever 12 and is, for example, perpendicular to an extension direction of the recess 1112, and the recess 1112 extends toward the brake lever 12.

The positioning part 112 is, for example, in a form of a plate can be fixed on the housing part 111 via, for example, a screw. In detail, the positioning part 112 has a through hole 1121, an outer annular surface 1122, a notch 1123, a first positioning structure 1124, and a second positioning structure 1125. The through hole 1121 is aligned with the insertion hole 1111 of the housing part 111. The notch 1123 is formed on the outer annular surface 1122. The first positioning structure 1124 and the second positioning structure 1125 are respectively connected to two opposite ends of the notch 1123 and located farther away from the outer annular surface 1122 than the notch 1123; that is, the first positioning structure 1124 and the second positioning structure 1125 are, for example, indentations from the part of the outer annular surface 1122 forming the notch 1123.

Further, the bottom part of the first positioning structure 1124 is referred to as a first bottom surface 1126, and the bottom part of the second positioning structure 1125 is referred to as a second bottom surface 1127. Furthermore, there are a minimum straight distance T1 between the first bottom surface 1126 and a central line L1 of the insertion hole 1111 and a minimum straight distance T2 between the second bottom surface 1127 and the central line L1 of the insertion hole 1111, where the minimum straight distance T1 is shorter than the minimum straight distance T2. In short, the first positioning structure 1124 is a deeper recess than the second positioning structure 1125.

Figure 4:
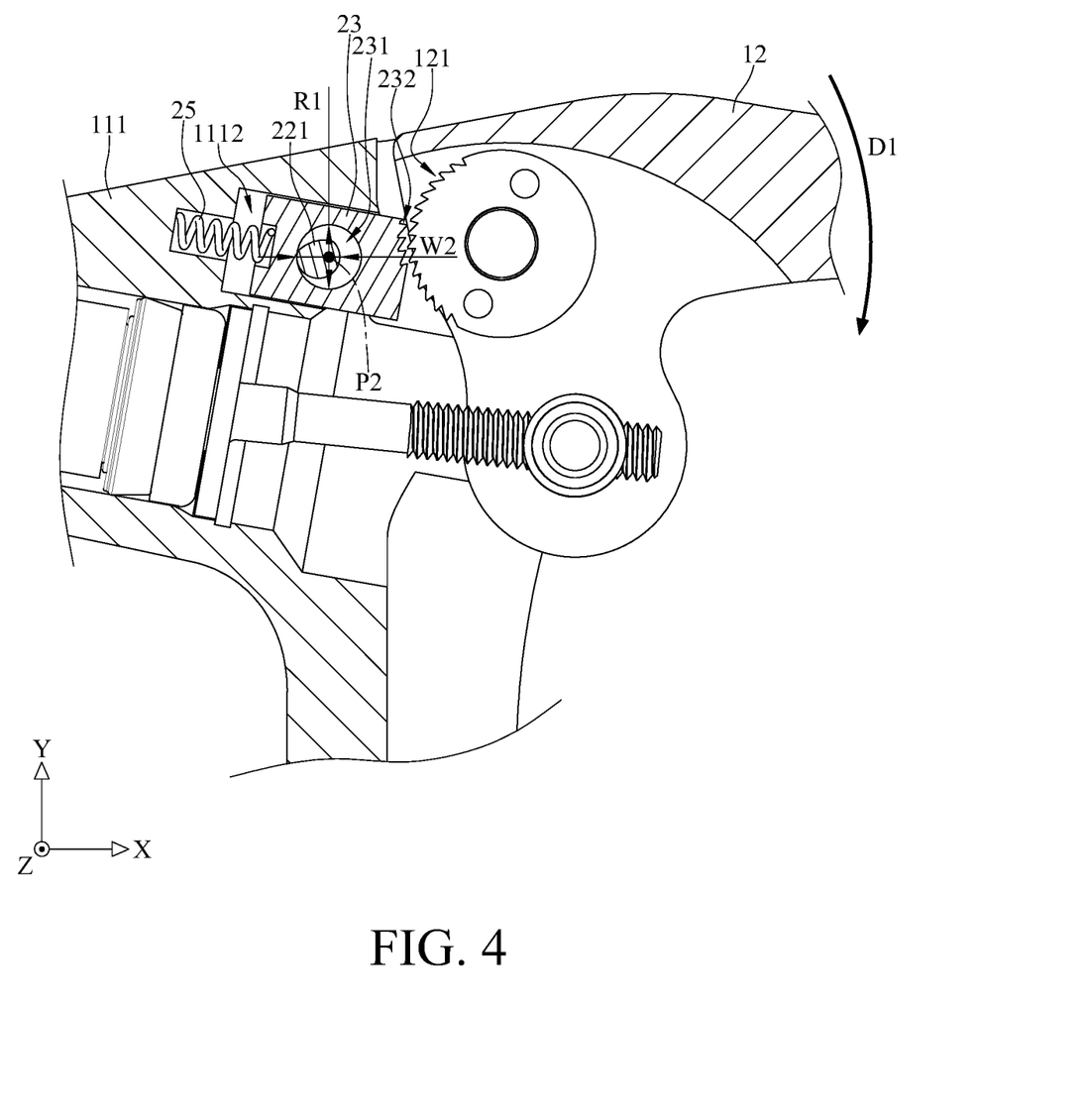
FIG. 4 is a partial enlarged cross-sectional view of the bicycle braking system in FIG. 3.

The parking brake mechanism 20 includes a control handle 21, a cam shaft 22, an engagement component 23, a clip 24, and an elastic component 25. The control handle 21 is fixed on an end of the cam shaft 22. The engagement component 23 is slidably located in the recess 1112 of the housing part 111 of the housing 11. The cam shaft 22 has an eccentric portion 221. The engagement component 23 has a through hole 231. The cam shaft 22 is rotatably disposed through the through hole 1121 of the positioning part 112 and the insertion hole 1111 of the housing part 111 of the housing 11. The eccentric portion 221 of the cam shaft 22 is movably located in the through hole 231 of the engagement component 23. The positioning part 112 is located between the control handle 21 and the housing part 111. An end of the cam shaft 22 located away from the control handle 21 sticks out from the housing part 111 and the clip 24 is employed thereto and in contact with the housing part 111 so as to fix the cam shaft 22 in position on the housing part 111. In this embodiment, a diameter R1 of the through hole 231 of the engagement component 23 is larger than a maximum width W2 of the eccentric portion 221 of the cam shaft 22. The elastic component 25 is disposed in the recess 1112 of the housing part 111 and located at a side of the engagement component 23 away from the brake lever 12. The elastic component 25 is clamped by the engagement component 23 and the housing part 111 so as to constantly force the engagement component 23 to move toward the brake lever 12.

In this embodiment, the brake lever 12 has an engagement portion 121, and the engagement component 23 further has an engagement structure 232 mating the engagement portion 121. As shown, the engagement portion 121 has teeth mating that of the engagement structure 232, such that the engagement portion 121 and the engagement structure 232 can be meshed to each other. And each tooth of the engagement structure 232 and the engagement portion 121 of the brake lever 12 has a moderate slope on one edge and a much steeper slope on the other edge.

In addition, an axis P2 of the control handle 21 overlaps with the central line L1 of the insertion hole 1111; in other words, the axis P2 and the central line L1 are coaxial. Therefore, it is understood that the minimum straight distance T1 between the first bottom surface 1126 and the axis P2 of the control handle 21 is also smaller than the minimum straight distance T2 between the second bottom surface 1127 and the axis P2 of the control handle 21. Furthermore, the eccentric portion 221 of the cam shaft 22 is, for example, a portion of the cam shaft 22 having smaller width, and the center of the eccentric portion 221 is deviated from the axis P2 of the control handle 21.

In this embodiment, the control handle 21 has an outer surface 211, an inner surface 212 opposite to the outer surface 211, and an accommodation recess 213 formed on the outer surface 211, and the positioning assembly 30 includes a positioning handle 31, a pivot shaft 32, a positioning component 33, and an elastic component 34. The positioning handle 31 is pivotably disposed on the control handle 21 via the pivot shaft 32. And at least part of the positioning handle 31 can be accommodated in the accommodation recess 213 of the control handle 21. An axis P3 of the positioning handle 31 is, for example, parallel to the axis P2 of the control handle 21. The positioning component 33 is, for example, a post protruding from a side of the positioning handle 31 facing towards the positioning part 112. The elastic component 34 is located in the accommodation recess 213 of the control handle 21 and having two opposite ends respectively pressing against the control handle 21 and the positioning handle 31. The elastic component 34 and the positioning component 33 are respectively located at two opposite sides of the axis P3 of the positioning handle 31.

In addition, the positioning part 112 of the housing 11 further has a positioning hole 1128 located at a side of the positioning part 112 close to the control handle 21, and the control handle 21 further has a recess 214 located close to the positioning part 112. The positioning assembly 30 further includes an elastic component 35 and a positioning bead 36. The elastic component 35 is located in the recess 214 of the control handle 21 and pressing against the positioning bead 36, and the positioning bead 36 is located closer to the positioning part 112 than the elastic component 35. The elastic component 35 is configured to force the positioning bead 36 to move toward the positioning part 112.

In this embodiment, the control handle 21 is pivotable between a released position and an engaging position, and the positioning handle 31 is pivotable between a locked position and an unlocked position.

As shown in FIGS. 3 and 4, when the control handle 21 is in the released position, the positioning bead 36 is located in the positioning hole 1128 by being forced by the elastic component 35, the eccentric portion 221 of the cam shaft 22 is in a position that can force the engagement component 23 to compress the elastic component 25 and to disengage the engagement structure 232 from the engagement portion 121 of the brake lever 12, and the positioning handle 31 is located in the accommodation recess 213 with the positioning component 33 located at the second positioning structure 1125 and in contact with the second bottom surface 1127. At this moment, the cooperation of the positioning component 33 and the second positioning structure 1125 can make the positioning handle 31 maintain the elastic component 34 in the compressed state.

Figure 5:
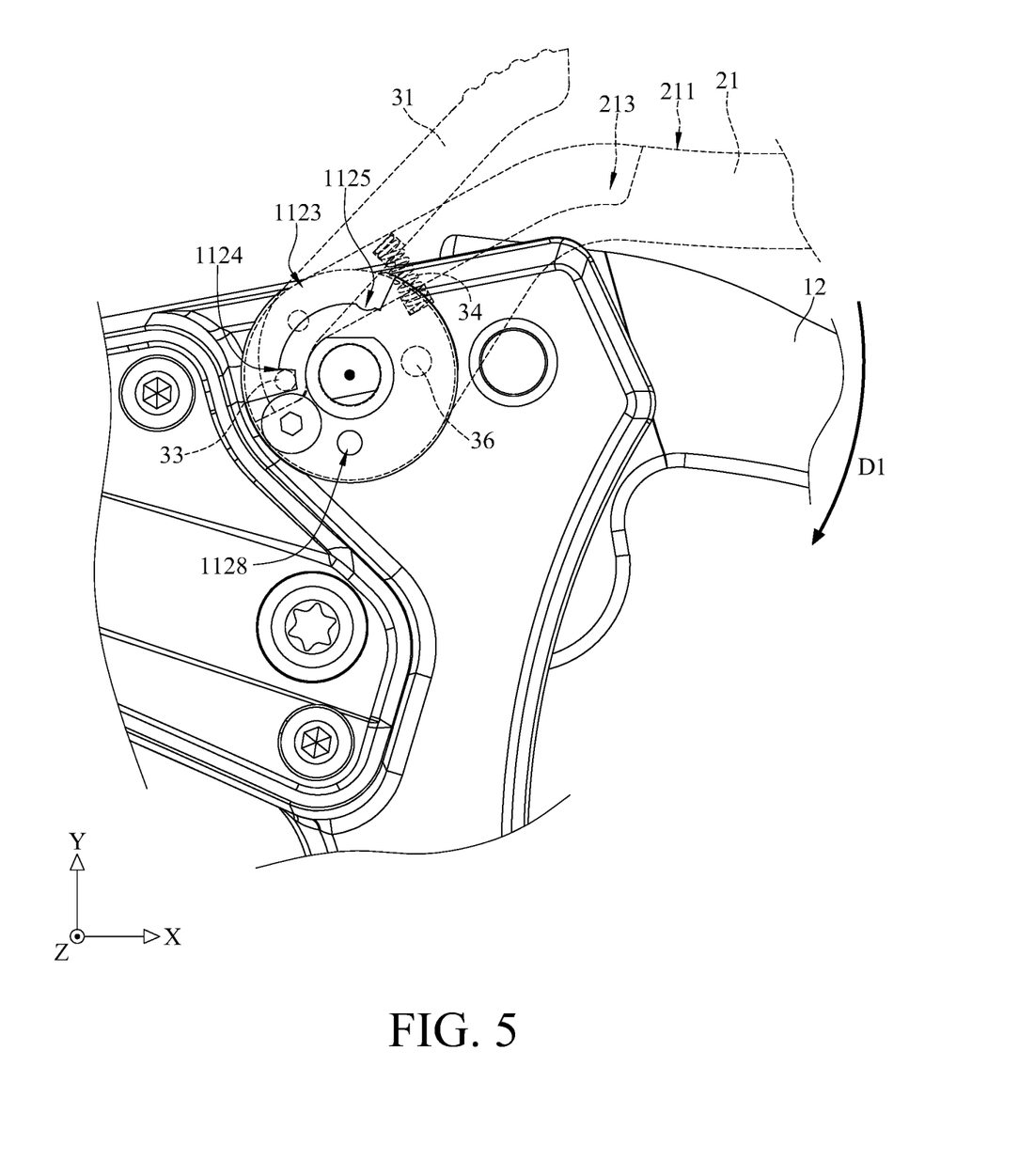
FIG. 5 is a partial enlarged top view of the bicycle braking system in FIG. 1 when the control handle is in an engaging position.
Figure 6:
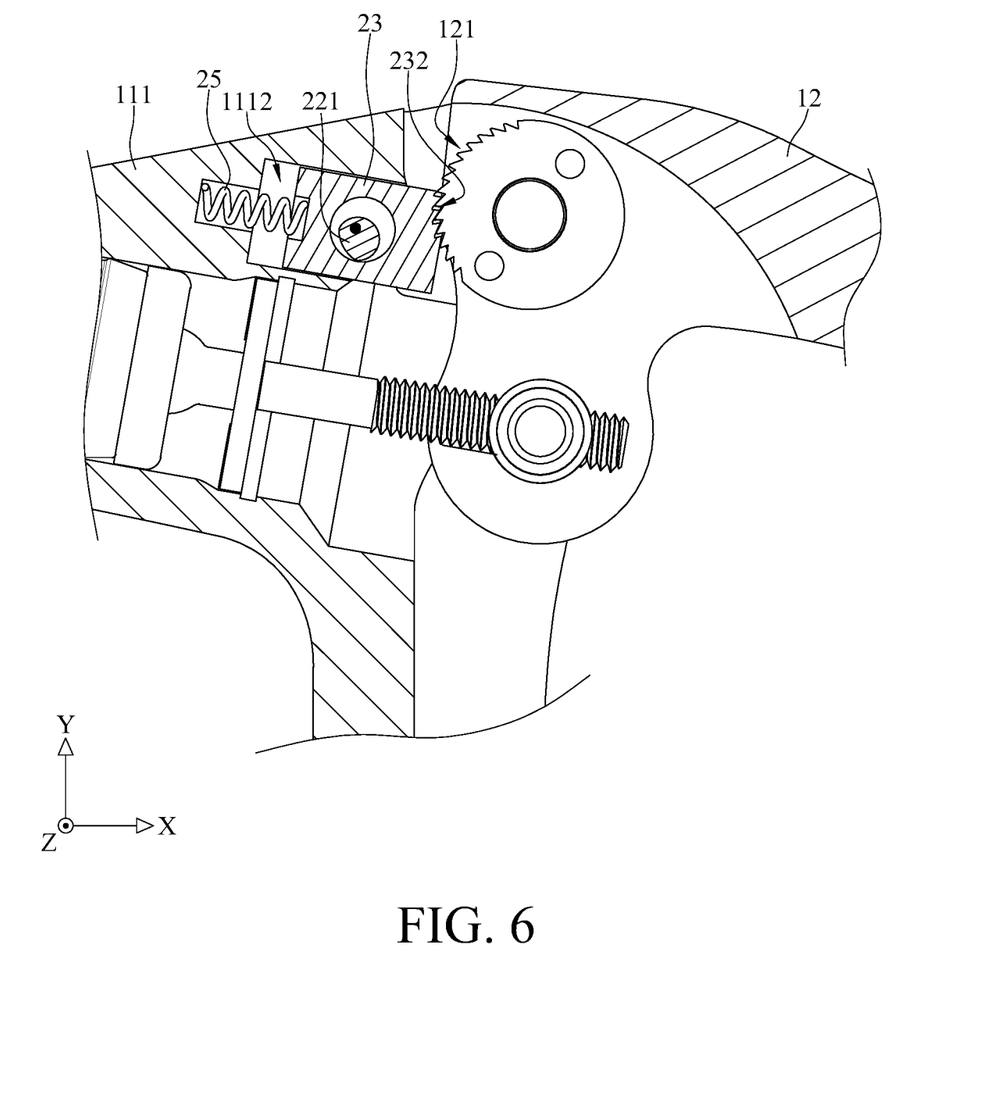
FIG. 6 is a partial enlarged cross-sectional view of the bicycle braking system in FIG. 5.

Then, referring to FIGS. 5 and 6, there are shown a partial enlarged top view of the bicycle braking system 1 in FIG. 1 when the control handle 21 is in the engaging position and a partial enlarged cross-sectional view of the bicycle braking system 1 in FIG. 5.

When the brake lever 12 is pulled along the direction D1 and the control handle 21 is pivoted along a direction opposite to the direction D1, the control handle 21 will be switched to the engaging position from the released position. During the movement of the control handle 21 from the released position to the engaging position, the positioning bead 36 is removed from the positioning hole 1128, and the eccentric portion 221 of the cam shaft 22 is rotated and allows the elastic component 25 to force the engagement component 23 to gradually move towards the brake lever 12 so as to engage the engagement structure 232 with the engagement portion 121 of the brake lever 12. Thus, when the control handle 21 is in the engaging position, the brake lever 12 can be fixed in the current position so that the bicycle is maintained in the braking state, allowing user to apply the brake without keeping pulling the brake lever 12.

In addition, during the movement of switching the control handle 21 to the engaging position, the positioning component 33 will be removed from the second positioning structure 1125 and moved to the first positioning structure 1124 along the notch 1123. As the control handle 21 reaches the engaging position, the elastic component 34 can be released to force the positioning handle 31 to pivot to the locked position along the direction opposite to the direction D1. As shown, the positioning handle 31 is sticking out the accommodation recess 213, and the positioning component 33 is maintained in the first positioning structure 1124. This can stop the control handle 21 from being pivoted to the released position along the direction D1. As a result, accidentally or unconsciously force applying to the control handle 21 will not cause it to be off from the engaging position. That is, the locked position of the positioning handle 31 is able to prevent the control handle 21 from unexpectedly causing the engagement structure 232 of the engagement component 23 to disengage from the engagement portion 121 of the brake lever 12.

Figure 7:
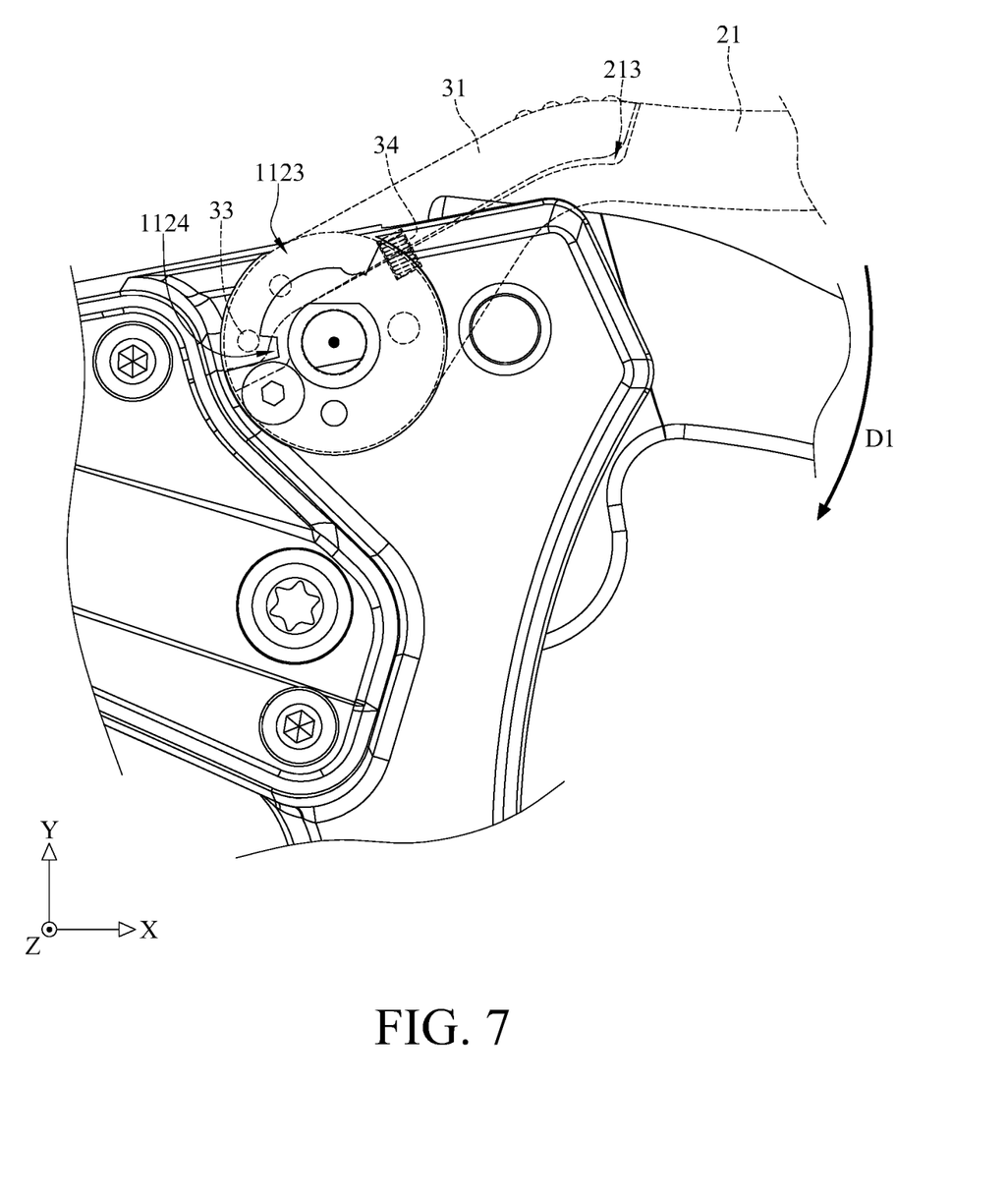
FIG. 7 is a partial enlarged top view of the bicycle braking system in FIG. 5 when a positioning handle is in an unlocked position.

Then, referring to FIG. 7, there is shown a partial enlarged top view of the bicycle braking system 1 in FIG. 5 when the positioning handle 31 is in an unlocked position.

The positioning handle 31 can be switched to the unlocked position along the direction D1. When the positioning handle 31 reaches the unlocked position, the positioning handle 31 is returned back into the accommodation recess 213 of the control handle 21 to compress the elastic component 34, and the positioning component 33 is removed from the first positioning structure 1124 and to be at the notch 1123. Then, the control handle 21 now is allowed to be pivoted to the released position (as shown in FIGS. 3 and 4) along the direction D1. During the movement of switching the control handle 21 back to the released position, the positioning component 33 and the positioning bead 36 are respectively moved toward the second positioning structure 1125 and the positioning hole 1128, and the eccentric portion 221 of the cam shaft 22 will move the engagement component 23 away from the brake lever 12 to make the engagement component 23 compress the elastic component 25. As discussed, when the control handle 21 is in the released position, the positioning component 33 and the positioning bead 36 are respectively located at the second positioning structure 1125 and the positioning hole 1128, and the engagement structure 232 of the engagement component 23 is disengaged from the engagement portion 121 of the brake lever 12, such that the brake lever 12 is released and therefore cancel the braking state of the bicycle.

In this embodiment, the cooperation of the positioning hole 1128, the positioning bead 36, and the elastic component 35 can help the control handle 21 to be positioned in the released position after the control handle 21 is moved to the released position.

In addition, the shallower second positioning structure 1125 can make most part of the positioning handle 31 hidden in the accommodation recess 213 as the control handle 21 is in the released position. And the cooperation of the elastic component 34 and the deeper first positioning structure 1124 can implement that the positioning handle 31 sticks out the accommodation recess 213 of the control handle 21 as the control handle is in the engaging position.

In this embodiment, the accommodation recess 213 of the control handle 21 is not restricted to be formed on the outer surface 211. For example, referring to FIG. 8, there is shown a partial enlarged top view of a bicycle braking system according to a second embodiment of the disclosure when a control handle 21a is in a released position.

Figure 8:
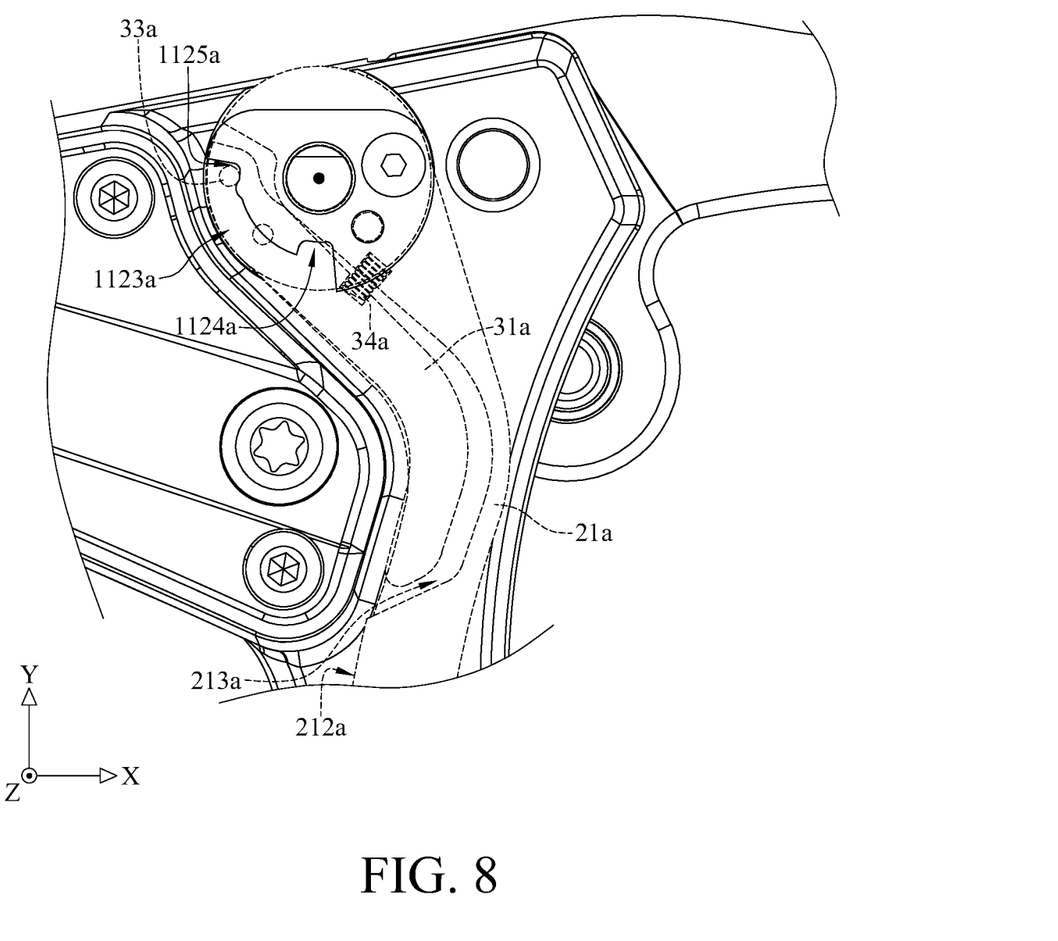
FIG. 8 is a partial enlarged top view of a bicycle braking system according to a second embodiment of the disclosure when a control handle is in a released position.

In this embodiment, the bicycle braking system is similar to the bicycle braking system 1 of the previous embodiment and thus the same or similar parts between them will not be repeatedly described hereinafter. In this embodiment, the control handle 21a has an accommodation recess 213a formed on an inner surface 212a of the control handle 21a.

Figure 9:
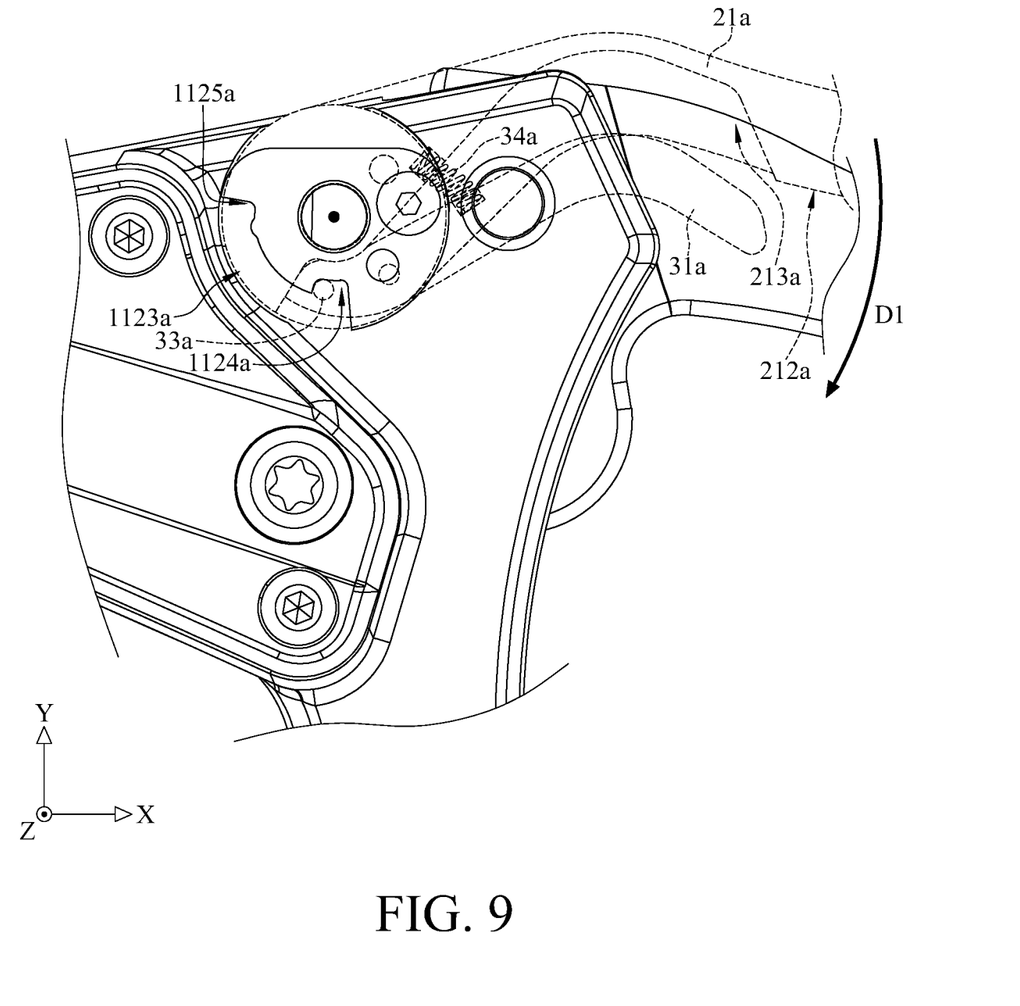
FIG. 9 is a partial enlarged top view of the bicycle braking system in FIG. 8 when the control handle is in an engaging position.

Then, referring to FIGS. 8 and 9, FIG. 9 is a partial enlarged top view of the bicycle braking system in FIG. 8 when the control handle 21a is in an engaging position.

When the control handle 21a is pivoted from a released position to an engaging position along the direction opposite to the direction D1, a positioning component 33a is removed from a second positioning structure 1125a and moved toward a first positioning structure 1124a along a notch 1123a. When the control handle 21a is in the engaging position, the elastic component 34a forces a positioning handle 31a to pivot to a locked position along the direction D1, such that the positioning handle 31a sticks out the accommodation recess 213a, and the positioning component 33a is maintained in the first positioning structure 1124a. As a result, accidentally or unconsciously force applying to the control handle 21 will not cause the control handle 21a to be moved to the released position along the direction D1.

Figure 10:
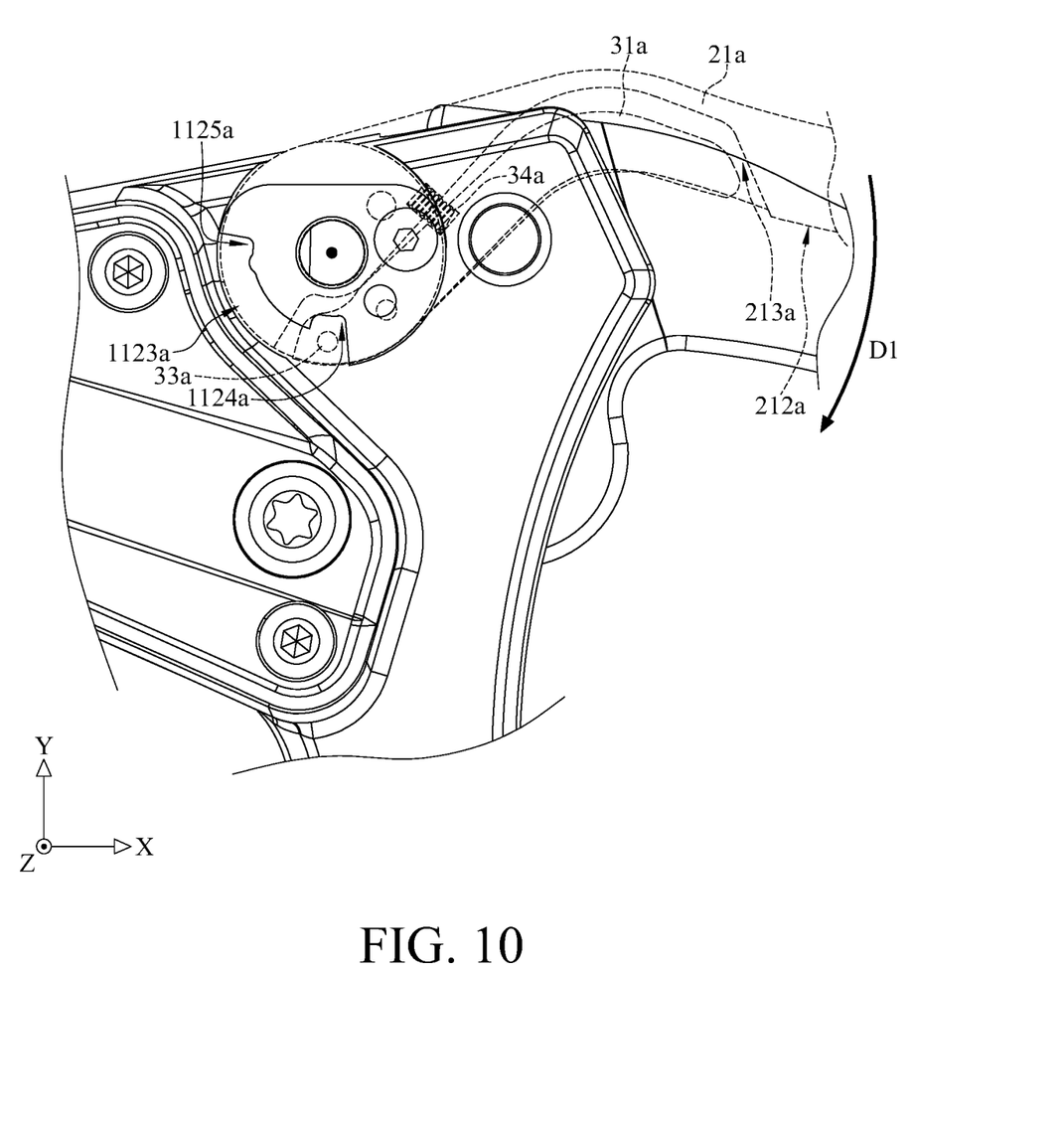
FIG. 10 is a partial enlarged top view of the bicycle braking system in FIG. 9 when the positioning handle is in an unlocked position.

Then, referring FIG. 10, there is shown a partial enlarged top view of the bicycle braking system in FIG. 9 when the positioning handle 31a is in an unlocked position. The positioning handle 31a can be switched from the locked position to an unlocked position along the direction opposite to the direction D1. When the positioning handle 31a is in the unlocked position, the positioning handle 31a is returned back into the accommodation recess 213a of the control handle 21a to compress the elastic component 34a, and the positioning component 33a is removed from the first positioning structure 1124a and to be located at the notch 1123a. Then, the control handle 21a can be moved from the engaging position to the released position (as shown in FIG. 8) along the direction D1.

According to the bicycle braking system as discussed above, when the positioning handle is in the locked position, the positioning component is positioned at the first positioning structure so as to stop the control handle from being pivoted with respect to the housing. As such, the positioning handle in the locked position can fix the control handle in position after the brake lever is pulled and engaged with the engagement component. Therefore, accidentally or unconsciously force applying to the control handle will not cause it to be disengaged from the engagement portion of the engagement component.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle braking system, comprising:
a lever assembly, comprising a housing and a brake lever, wherein the brake lever is pivotably disposed on the housing, the housing has a first positioning structure, and the brake lever has an engagement portion;
a parking brake mechanism, comprising a control handle and an engagement component connected to the control handle, wherein the control handle is pivotably disposed on the housing, and the control handle is pivotable with respect to the housing to make the engagement component to engage or disengage with the engagement portion; and
a positioning assembly, comprising a positioning handle pivotably disposed on the control handle and having a locked position and an unlocked position;
wherein when the positioning handle is in the locked position, the positioning handle is positioned at the first positioning structure so as to stop the control handle from be pivoted with respect to the housing; when the positioning handle is in the unlocked position, the positioning handle is removed from the first positioning structure so as to allow the control handle to become pivotable with respect to the housing.

2. The bicycle braking system according to claim 1, wherein the parking brake mechanism further comprises a cam shaft, the control handle is connected to the engagement component via the cam shaft, the control handle is pivotably disposed on the housing via the cam shaft, the positioning assembly further comprises a positioning component connected to the positioning handle;
when the positioning handle is in the locked position, the positioning handle is positioned at the first positioning structure via the positioning component; when the positioning handle is in the unlocked position, the positioning component is removed from the first positioning structure.

3. The bicycle braking system according to claim 2, wherein the control handle has an engaging position and a released position; when the control handle is in the engaging position, the engagement component is engaged with the engagement portion, and the positioning handle is in the locked position; when the positioning handle is in the unlocked position, the control handle is pivotable between the engaging position to the released position; when the control handle is in the released position, the engagement component is removed from the engagement portion.

4. The bicycle braking system according to claim 3, wherein the housing further has an outer annular surface and a notch, the notch is formed on the outer annular surface, the first positioning structure is connected to an end of the notch and located farther away from the outer annular surface than the notch.

5. The bicycle braking system according to claim 4, wherein the housing further has a second positioning structure, the second positioning structure is connected to another end of the notch and located farther away from the outer annular surface than the notch; when the control handle is in the released position, the positioning component is positioned at the second positioning structure.

6. The bicycle braking system according claim 5, wherein the housing comprises a housing part and a positioning part, the positioning part is fixed on the housing part, the outer annular surface, the notch, the first positioning structure and the second positioning structure are located at the positioning part, the brake lever is pivotably disposed on the housing part, the control handle is pivotably disposed on the housing part and the positioning part.

7. The bicycle braking system according to claim 5, wherein the positioning assembly further comprises a elastic component, two opposite ends of the elastic component respectively press against the control handle and the positioning handle; when the control handle is in the engaging position, the elastic component forces the positioning handle to pivot to the locked position; when the positioning handle is in the unlocked position, the positioning handle makes the elastic component to store an elastic force.

8. The bicycle braking system according to claim 7, wherein the first positioning structure and the second positioning structure are indentations, the housing further has a first bottom surface located in the first positioning structure and a second bottom surface located in the second positioning structure, a minimum straight distance between the first bottom surface and an axis of the control handle is smaller than a minimum straight distance between the second bottom surface and the axis of the control handle, the control handle has an accommodation recess, the elastic component is in the accommodation recess; when the control handle is in the engaging position, the positioning handle is partially located outside the accommodation recess; when the positioning handle is in the unlocked position, the positioning handle is located in the accommodation recess; when the control handle is in the released position, the second bottom surface is in contact with the positioning component so as to force the positioning handle to compress the elastic component, and the positioning handle is located in the accommodation recess.

9. The bicycle braking system according to claim 8, wherein the control handle has an outer surface and an inner surface opposite to each other, and the accommodation recess is formed on the outer surface.

10. The bicycle braking system according to claim 8, wherein the control handle has an outer surface and an inner surface opposite to each other, and the accommodation recess is formed on the inner surface.

11. The bicycle braking system according to claim 3, wherein the control handle is fixed on an end of the cam shaft, the cam shaft has an eccentric portion, the engagement component has a through hole, the cam shaft is rotatably inserted into the housing, the eccentric portion is movably located in the through hole of the engagement component; when the control handle is in the engaging position, the eccentric portion forces the engagement component to be engaged with the engagement portion; when the control handle is in the released position, the eccentric portion forces the engagement component to be disengaged with the engagement portion.

12. The bicycle braking system according to claim 11, wherein a diameter of the through hole is larger than a maximum width of the eccentric portion, the parking brake mechanism further comprises an elastic component, the elastic component of the parking brake mechanism is disposed on the engagement component, and the elastic component is configured to force the engagement component to move toward the brake lever.

13. The bicycle braking system according to claim 11, wherein the parking brake mechanism further comprises a clip, an end of the cam shaft away from the control handle sticks out the housing and is located outside the housing, the clip is fixed on the end of the cam shaft away from the control handle and in contact with the housing.

14. The bicycle braking system according to claim 3, wherein the housing has a positioning hole, the control handle has a recess located close to the housing, the positioning assembly further comprises an elastic component a positioning bead, the elastic component of the positioning assembly is located in the recess of the control handle and in contact with the positioning bead, the positioning bead is located closer to the housing than the elastic component, the elastic component is configured to force the positioning bead to move toward the housing; when the control handle is in the released position, the elastic component forces the positioning bead to be located in the positioning hole.

* * * * *